United States Patent
Raghuraman et al.

(10) Patent No.: US 7,516,209 B2
(45) Date of Patent: Apr. 7, 2009

(54) METHOD AND FRAMEWORK FOR TRACKING/LOGGING COMPLETION OF REQUESTS IN A COMPUTER SYSTEM

(75) Inventors: Melur K. Raghuraman, Sammamish, WA (US); Jee Fung Pang, Woodinville, WA (US); Insung Park, Redmond, WA (US); Christopher M. Davis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 867 days.

(21) Appl. No.: 10/607,592

(22) Filed: Jun. 27, 2003

(65) Prior Publication Data

US 2005/0021708 A1 Jan. 27, 2005

(51) Int. Cl.
*G06F 15/173* (2006.01)
(52) U.S. Cl. ............... 709/224; 709/201; 709/223; 709/245; 719/319; 717/127; 717/128
(58) Field of Classification Search ........... 709/224, 709/225, 201, 203, 218, 223; 717/127, 128; 719/318, 319; 714/45
See application file for complete search history.

(56) References Cited

U.S. PATENT DOCUMENTS

| | | | |
|---|---|---|---|
| 5,485,616 A | | 1/1996 | Burke et al. |
| 5,493,689 A | | 2/1996 | Waclawsky et al. |
| 5,506,955 A | | 4/1996 | Chen et al. |
| 5,642,478 A | * | 6/1997 | Chen et al. ............... 714/45 |
| 5,689,712 A | | 11/1997 | Heisch |
| 5,838,976 A | | 11/1998 | Summers |
| 6,256,775 B1 | | 7/2001 | Flynn |
| 6,415,322 B1 | * | 7/2002 | Jaye ............... 709/224 |
| 6,470,491 B1 | * | 10/2002 | Chen et al. ............... 717/127 |
| 6,539,339 B1 | | 3/2003 | Berry et al. |
| 6,678,883 B1 | * | 1/2004 | Berry et al. ............... 717/128 |
| 6,742,030 B1 | * | 5/2004 | MacPhail ............... 709/224 |
| 6,802,054 B2 | * | 10/2004 | Faraj ............... 717/128 |
| 6,944,797 B1 | * | 9/2005 | Guthrie et al. ............... 717/128 |
| 7,424,716 B1 | * | 9/2008 | Goswami et al. ............... 719/318 |
| 2003/0005021 A1 | * | 1/2003 | Shah et al. ............... 709/1 |
| 2005/0160431 A1 | * | 7/2005 | Srivastava et al. ............... 719/313 |
| 2005/0183068 A1 | * | 8/2005 | Cwalina et al. ............... 717/128 |
| 2007/0255979 A1 | * | 11/2007 | Deily et al. ............... 714/45 |

OTHER PUBLICATIONS

Microsoft, "ASP.NET QuickStarts Tutorial: Application-level Trace Logging", 2002, Accessed on Feb. 28, 2007 from http://wwwsamples.gotdotnet.com/quickstart/aspplus/doc/tracelogapp.aspx.*

(Continued)

*Primary Examiner*—Ramy M Osman
(74) *Attorney, Agent, or Firm*—Marshall, Gerstein & Borun LLP

(57) ABSTRACT

A framework and method are disclosed for carrying out request completion tracing across request identification boundaries. When a request traverses an identification boundary, an event identifies the old and new request identifications and stores this linking information in a trace event record. Thereafter, a consumer of records maintains track of request completion by incorporating the linking information to switch identifications used to track completion of the request across request identification boundaries encountered by the system while responding to the received request. A request trace event record consumer architecture with enhanced tracking capabilities based upon a specified state machine provides greater power when interpreting the trace records associated with completion of requests by a server system.

23 Claims, 14 Drawing Sheets

OTHER PUBLICATIONS

Dauphin et al, "SIMPLE: A universal tool box for Event Trace Analysis", 1996, IEEE, vol. 1087-2191/96, p. 59.*

Azimi et al, "A Sorftware Approach to Multiprocessor Address Trace Generation", 1990, IEEE, vol. 0730-3157/90, pp. 99-105.*

* cited by examiner

300 Thread ID
302 Process ID
304 Time Stamp
306 Event GUID
308 Event Type
310 Instance ID
312 Parent Instance ID
314 Parent Event GUID
316 Machine Name

FIG. 3a

320 Source IP Address
322 Destination IP Address
324 Source Port
326 Destination Port
328 Size of Transfer (in bytes)
330 Process ID

```
<Request>
    <Event>
        <EventID> MyAppRequest </EventID>
        <EventType> Start </EventType>
        <TrackingID> RequestHandle </TrackingID>
    </Event>
    <Event>
        <EventID> ComponentA </EventID>
        <EventType> Start </EventType>
        <TrackingID> ThreadId </TrackingID>
    </Event>
    <Event>
        <EventID> TcpIp </EventID>
        <EventType> Send </EventType>
        <TrackingID> DestPort </TrackingID>
    </Event>
    <Event>
        <EventID>TcpIp</EventID>
        <EventType> Receive </EventType>
        <TrackingID> DestPort </TrackingID>
    </Event>
    <Event>
        <EventID>TcpIp</EventID>
        <EventType> Receive </EventType>
        <TrackingID> SourcePort </TrackingID>
    </Event>
    <Event>
        <EventID>ComponentB</EventID>
        <EventType> Start </EventType>
        <TrackingID> ThreadID </TrackingID>
    </Event>
    <Event>
        <EventID>ComponentB</EventID>
        <EventType> End </EventType>
        <TrackingID> ThreadID </TrackingID>
    </Event>
</Request>
```

FIG. 7a

```
<Request>
    <Name> Directory Scan </Name>
    <Event>
        <EventID>DirOpen</EventID>
        <EventType> Start </EventType>
        <TrackingID>FileHandle</TrackingID>
    </Event>
    <Event>
        <EventID>DirOpen</EventID>
        <EventType> End </EventType>
        <TrackingID>FileHandle</TrackingID>
    </Event>

<Loop>
        <Event>
            <EventID>DirRead</EventID>
            <EventType> Start </EventType>
            <TrackingID>FileHandle</TrackingID>
        </Event>
        <Event>
            <EventID>DirRead</EventID>
            <EventType> End </EventType>
            <TrackingID>FileHandle</TrackingID>
        </Event>
    </Loop>
    <Event>
        <EventID>DirClose</EventID>
        <EventType> Start </EventType>
        <TrackingID>FileHandle</TrackingID>
    </Event>

<Event>
        <EventID>DirClose</EventID>
        <EventType> End </EventType>
        <TrackingID>FileHandle</TrackingID>
    </Event>
</Request>
```

FIG. 7b

METHOD AND FRAMEWORK FOR TRACKING/LOGGING COMPLETION OF REQUESTS IN A COMPUTER SYSTEM

FIELD OF THE INVENTION

This invention generally relates to the area of computer systems. More particularly, the present invention concerns software performance evaluation utilities/tools, and in particular, methods and systems for monitoring and reporting statistical data regarding the completion of particular executed requests by, for example, a server system. Such monitoring tasks include acquisition/generation of performance data regarding completion of requests received and processed by a server system.

BACKGROUND OF THE INVENTION

It seems that no matter how fast/powerful computer technology becomes, users will never be completely satisfied with the speed with which their requests are handled. When their need for immediate responsiveness is not met, users seek other, more responsive systems to fulfill their computing needs. Today many software products are capable of meeting users' functional needs. Performance (e.g., responsiveness, efficiency, etc.) of the otherwise similar software systems has become increasingly important as a distinguishing characteristic.

Recognizing the importance of responsiveness of servers/services to ensuring consumer satisfaction, substantial effort is directed during software development/testing to ensure that performance is optimized in a computer software system. One way to ensure superior performance is to utilize software program architectures/frameworks that provide proven superior performance (e.g., speed, efficiency, etc.). Another way to ensure performance requirements are satisfied is to identify and correct portions of a software system that are adversely affecting performance (e.g., system bottlenecks, excessive resource drains).

Performance information is used in a variety of ways by software/system developers over the lifetime of the software to identify and correct poorly performing software. During the initial development stages, performance measurements are used to detect and remedy design or implementation deficiencies. Later, performance measurements can be used to respond to user concerns—to determine whether the particular software system is responsible for the performance problem. In yet other cases, performance information can be used to compare performance between earlier and later versions of software.

As used herein, a "request" refers to a request by an entity (e.g., a client) for some task to be performed by another entity (e.g., a server). A request has a finite life time, and the state of a request on the server, or other entity that executes the request, is determined by past events that have previously occurred ("fired") in the course of fulfilling/completing the request. An event, within the context of tracing request completion, reflects/indicates the traced request's current state. Event tracing comprises recording the event along with relevant state information. In a simplest case, the request comprises a single executed identifiable task referred to herein as a "transaction." However, completion of a request can involve/include a series of subtasks or "transactions" to be executed to generate the results for the requesting entity/client. A transaction is delimited by a start and end. As will be further explained herein below, the transactions resulting from a request may be nested or executed in a sequential fashion.

Performance testing is carried out in a variety of ways. For example, in known software performance evaluation tools, counters tally completion of tasks by a particular program component within a test period. By submitting a stream of requests at a rate that saturates a program component under test, one can determine its processing bandwidth. However, such testing is unrealistic in a multi-thread/multiprocessing computing environment where other programs share execution resources with the program component. This shortcoming can be addressed, at least partially, by submitting a mix of requests that simulate a typical load. Of course, one must first determine what constitutes a typical load. Furthermore, a typical load for a software program will likely vary from user to user—as well as the computer system hardware environment within which the software is executed.

Another way in which to assess system performance involves measuring the actual time required to execute a request through event tracing. Event tracing provides a set of time stamped log entries marking particular points of a server's completion of a request. In a known request execution tracing tool, trace events are fired at specified points within program code executed by a thread while completing a transaction or a series of transactions associated with a request. The trace events are logged as a sequence of trace records that include an event name, type, thread ID, and timestamp. Commencement and completion of a transaction is marked/measured by a traced start event and end event. Trace records also mark changes of state and save instantaneous parameter values. By storing an event name, a thread identification, event type (start/end), and a time when the event name/type occurred, the amount of time to complete each single-threaded transaction or set of transaction can be calculated. Thereafter, performance of the software is evaluated in light of the times for completing requests—as indicated by the logged trace events.

In more complex cases, execution of a request is traced within a single thread across multiple nested transactions. For example, Event A commences in response to a request, a nested transaction marked by Event B begins in response to starting a called function within the same thread, Event B ends and the program code associated with Event A resumes processing until Event A ends. This sequence of operations performed by a single thread is reported as a set of four, time-stamped traced event entries in a trace log (one for the start/end of each Event) including a same thread ID for each event. From this data, performance evaluators determine the total time to complete Event A (from start to finish) inclusive and exclusive of the time for executing Event B. For example, if Event A start-stop equals 15 units of time and Event B start-stop equals 5 units of time, then Event A required 10 units of time exclusive of nested Event B.

These prior means for providing performance data are useful to analyzing single threaded transactions and analyzing the operation of a single component in isolation. However, their utility is limited in servers or other complex computing systems where a request is likely to take on many different identities throughout the course of its completion (involving potentially many transactions). In these environments, the request is submitted to an entry point and returns at a later time. However, measuring only the entry and exit points of server request transactions gives little information about the delays encountered while various components of/processes within the server complete the transaction.

SUMMARY OF THE INVENTION

The present invention comprises a method and framework for generating/providing enhanced transaction completion data that traces completion of specific requests as they pass between request identification boundaries where a request identification changes (e.g., thread/process changes, machine transfers, etc.) thereby confounding tracing the transaction's traversal of multiple threads, processes, machines, etc. as it completes. Enhanced request tracking in accordance with the present invention thus comprises systematically linking a series of traces associated with different tasks executed within the context of a single request. The linked transaction traces, in turn are processed by any of a variety of consumers that digest the raw data provided within trace logs to generate a variety of summaries aiding diagnosing and correcting performance shortcomings in complex software systems comprising multiple distinct components.

While the prior art provides valuable information regarding single-thread transaction processing, the prior art tracing loses track of completion progress at thread/process boundaries. The present invention overcomes request identification boundaries to enable tracing transaction completion spanning multiple threads, processes, and even machines. Transaction completion tracing across multiple threads/processes is facilitated, in accordance with the present invention, by enhancing trace event calls and recording/logging, for logged trace events, handoff information that links threads associated with a same completed transaction. Thereafter, or on the fly, a trace log consumer processes the events to generate reports summarizing a variety of performance parameters relating to completion of transactions with a higher degree of granularity/flexibility than was achievable in prior art performance analysis utilities/tools.

In accordance with the invention a method and framework facilitate tracking completion of a request across a request identification boundary. Such boundaries, characterized by a change of request identification, are encountered in systems including a trace log for recording event firings as a request progresses through various stages of request completion. The present invention maintains tracking across such request identification boundaries by performing the following combination of activities during the request completion. A first event including a first request identification is logged in response to an event firing. Later, in association with completion of the same request, a second event including a second request identification is logged. The two records, associated with completing the same request, but having differing request identifications, are associated, for later processing by a consumer application by storing linking information, within the trace log marking a transition of the request identification from the first request identification to the second request identification.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 3a and 3b are schematic diagrams summarizing the fields of an exemplary trace log record;

FIG. 5b is partial spreadsheet printout including a set of event log records including linking information for tracking request completion across request identification boundaries;

FIG. 7a is a state machine depicting expected request event record flow that is used by a consumer to guide processing of event trace records;

FIG. 7b is a state machine depicting expected event flow for an directory scan composite request.

DETAILED DESCRIPTION OF THE DRAWINGS

In the illustrative embodiment of the present invention, a request transaction event tracing framework facilitates tracking completion of a request across request identification boundaries that, in the past, have limited the value of trace event logging as a performance evaluation tool. The transaction event tracing framework, in an embodiment of the invention, generates/logs handoff information at each trace identification boundary (e.g., when a request is received for handling by a target thread/process having an identification differing from a source thread/process). Such boundaries are present, for example in MICROSOFT's IIS software systems for processing Internet requests.

In an embodiment of the invention, the request completion tracing extends over multiple computing machines. In this case, synchronized timing cannot be guaranteed. Instead, event times on each machine are treated as relative values. Synchronization is achieved, for example, by applying an offset value to times generated by a slave computing system based upon a comparison of clock values maintained by a master computing system and the slave computing system.

By way of example, the handoff information is stored along with the thread/process identification, time stamp, etc. in a trace log. The contents of the trace log are thereafter processed by a trace log consumer. In an embodiment of the invention, the trace log analyzer utilizes the handoff information to link trace events having differing thread/process identifications. Furthermore, in an embodiment of the invention, the trace log analyzer is driven by an state machine. The state machine defines a set of linked events/paths that are potentially taken during the course of completing a traced request comprising a sequence of transactions. The state machine guides reconstruction of transaction sequences in traced requests recorded within the trace log.

Figure 1:
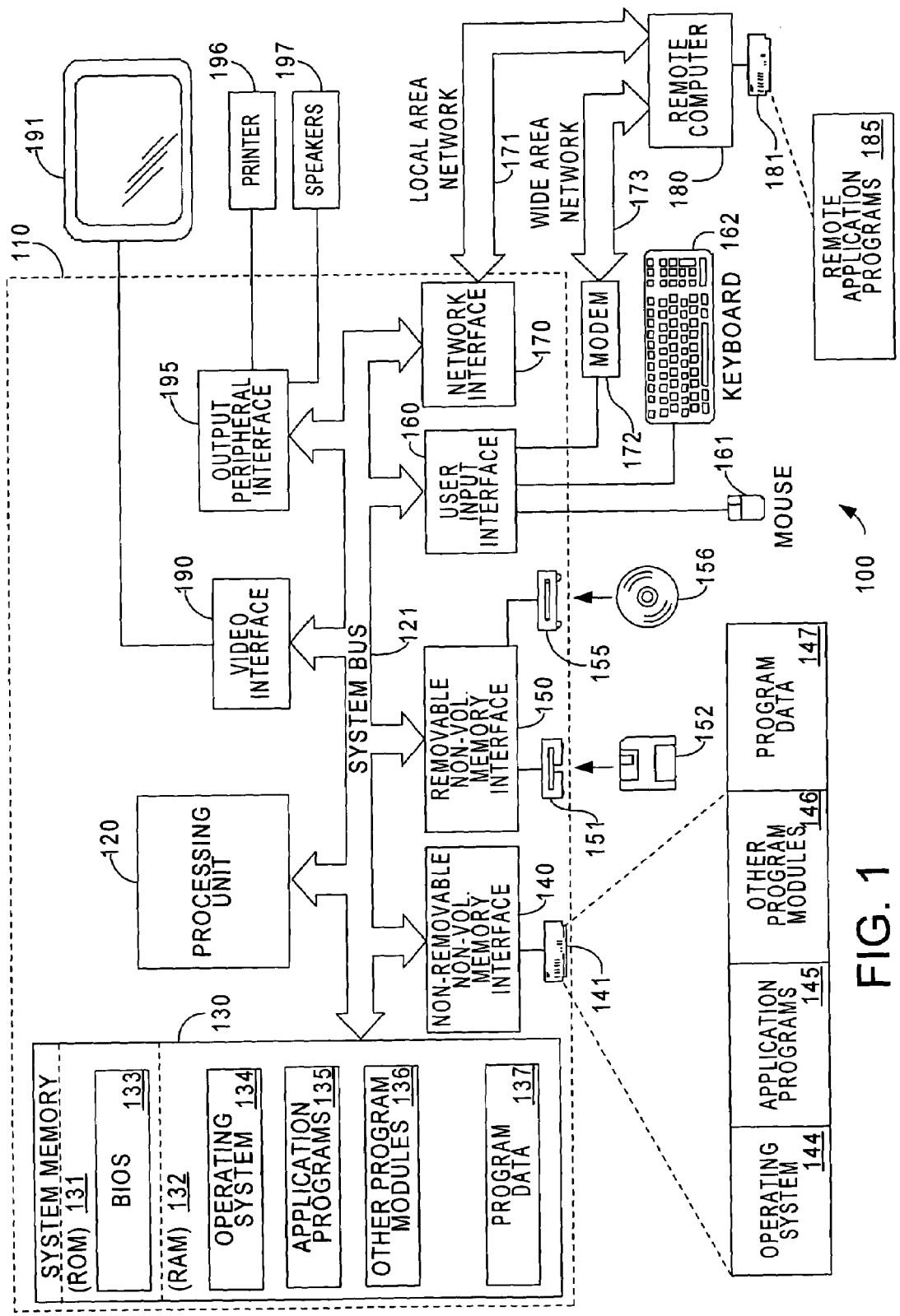
FIG. 1 is a simplified schematic illustrating an exemplary architecture of a computing device for carrying out transaction completion tracing/logging functions in accordance with an embodiment of the present invention.

FIG. 1 illustratively depicts an example of a suitable operating environment 100 for carrying out the transaction trace event correlation framework in accordance with an embodiment of the present invention. The operating environment 100 is only one example of a suitable operating environment, and is not intended to suggest any limitation as to the scope of use or functionality of the invention. Other well known computing systems, environments, and/or configurations that may be suitable for use with the invention include, but are not limited to, personal computers, server computers, laptop/portable computing devices, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
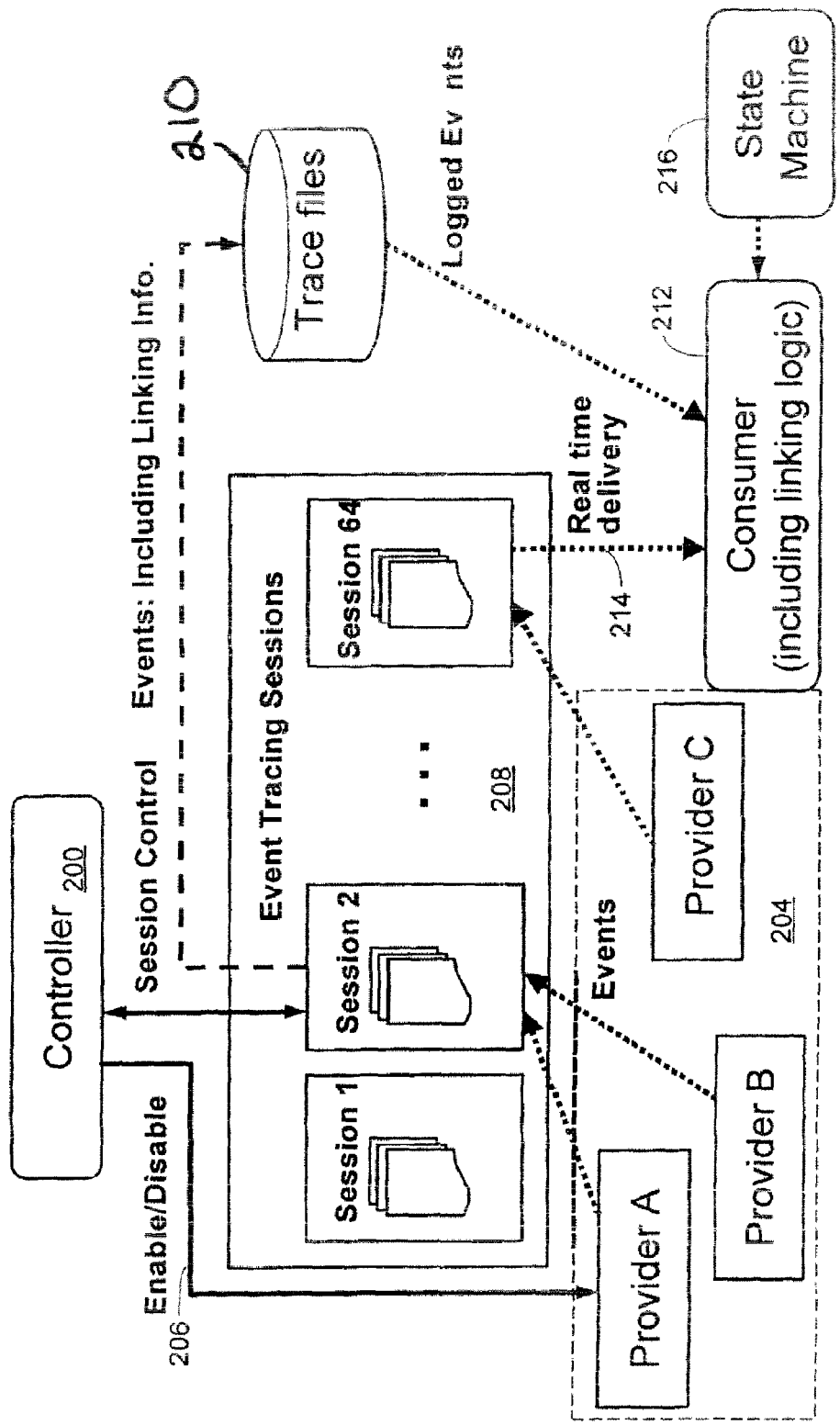
FIG. 2 is an exemplary functional block diagram depicting a set of components associated with trace event logging in accordance with an embodiment of the invention.

Turning to FIG. 2, an exemplary general transaction completion tracing framework is schematically depicted for generating and processing a log containing sequences of trace events corresponding to completed transactions. A controller 200, such as the Logman.exe trace control tool, that ships as part of MICROSOFT WINDOWS XP, starts and stops event trace collection in specified ones of a set of providers 204. As indicated by line 206 between the controller 200 and provider A of the set of providers 204, the controller 200 issues commands selectively enabling/disabling particular ones of the providers 204.

In an embodiment of the invention, each of the set of providers 204 includes trace event method calls. The trace events are directed to an operating system event logging facility. When activated, the trace event method calls, embedded within program code, fire when encountered. The firing of the trace events results in the creation of trace log records (an example of which is described herein below with reference to FIG. 3), including relevant trace information. Thus, after receiving an enable command from the controller 200, the trace instructions within the set of providers 204 fire trace events that initiate placing trace information within a trace log buffer maintained by a designated one of a set of event tracing sessions 208. In the illustrative embodiment of the invention, the controller 200 sets up (and closes out) an event tracing session (e.g., session 2) through session control commands. Each event trace session of the set of event trace sessions 208 is characterized by one or more providers from the set of providers 204 that supply trace event information to a particular session's buffer(s). The buffer used by a provider is based, for example, upon the processor within which the provider executes. The controller 200, as part of the enabling process designates the session (e.g., session 2) to which a provider (e.g., provider B) will supply event data when the provider's events fire. In an exemplary embodiment of the invention, a provider corresponds to a particular server component that carries out a transaction within a server.

At some point after enabling an event tracing session, the event log records from the session are transferred, under direction of the controller 200, to one or more trace files 210. Each trace file generally contains a list/set of trace records including particular identification data, general information regarding the event, and a timestamp identifying when a corresponding event fired. In accordance with an embodiment of the present invention, the trace event logs transferred to the trace files 210 include, in instances where a request traverses at least one request identification boundary, information linking a previously used identification and a new request identification utilized in, for example, a recipient component of a server. The linking information is generated, in accordance with an embodiment of the invention, by firing a handoff/delivery event for a request each time it encounters a request identification boundary (e.g., each time the request identification in the sequence of traced events for a single request changes).

The linking information transferred from the event tracing sessions 208 to the trace files 210 enables an event trace record consumer utility 212 to generate request completion information from a request that spans multiple transactions having differing identifications. For example, the total actual elapsed time in servicing a request (not including queued wait times) can be generated from a set of start/end timestamps stored within trace entries within server processing a request through a set of processes/threads having differing—yet linked—identifications. Alternatively, rather than waiting for a set of trace records to be accumulated by a session and transferred to the trace file 210, a session (e.g. session 64) forwards request completion event records directly to the consumer utility 212 (as indicated by line 214 labeled real time delivery).

It is noted that there are a number of ways in which the raw event information can be processed to trace the completion of a request across request identification boundaries. In a particular embodiment of the invention, the event trace record consumer utility 212 is a generalized processing engine that digests event records and creates links between completed processes having differing assigned identifications. The consumer utility 212's operation is driven, in particular circumstances by a state machine manifest 216 (described further herein below).

It is noted that the present invention contemplates using a broad variety of ways to initiate and carry out event trace log generation such that completion of a request can be traced as processing traverses one of more request identification boundaries. The above-described controller/provide/consumer arrangement is merely one example. For example, the exemplary request completion tracing architecture depicted in FIG. 2 includes a controller 200 that manages the set of event trace sessions 208. However, in an embodiment of the invention, an instance of the controller 200 is created for each one of the set of trace sessions 208. While the consumer 212 and state machine manifest (script) 216 are identified as separate entities in FIG. 2, in alternative embodiments the state machine definitions are incorporated into the consumer logic.

Turning to FIG. 3a, an exemplary set of fields of a trace log record stored by the event tracing sessions 208 is depicted. In an embodiment of the invention, trace records provide the following base information. A thread ID 300 corresponds to a value assigned to the thread from which the event fired. A process ID 302 corresponds the process within which the identified thread operates. A TimeStamp 304 records a machine time assigned to a fired event. It is noted that this value may need to be corrected by an offset in the case of requests executed across multiple machines. An Event Guid 306 identifies a class (grouping) of events. Examples of classes of events include: DiskIO, PageFault, etc. An Event Type 308 specifies a specific type of event within a particular event class. Examples of various identified event types include: Start, End, CheckPoint, Dequeue, Deliver etc. A checkpoint event type signals a thread relinquishing processing of a request. A dequeue event type signals a thread acquiring processing of a request.

An Instance ID 310 is an identification assigned to an object associated with the currently executing task. The Instance ID 310 enables identification of a particular instance of an object that is responsible for the logged event record and provides yet another piece of information potentially available for tracking completion of a request. A Parent Instance Id 312, though optional, plays a key role in carrying out a particular embodiment of the invention by storing linking information (e.g., the thread ID of a current component that is passing a request to a next programming component) that enables linking two adjacent distinct software components that sequentially execute a request under differing request identifications. The Parent Instance Id 312 is just one example of an information field that facilitates overcoming request identification boundaries when tracing completion of requests by a set of server components. A Parent Event Guid 314 is similar to the above-described Event Guid 306. In an embodiment of the invention, the Parent Event Guid 314 identifies the event class of the current component that is passing a request to a next programming component in a set of components that execute a single request. A MachineName 316, containing a machine name extracted for example from a log file header of a trace file, identifies a machine upon which the event was fired. This information is important in tracking requests executed across potentially many machines and/or processors (if given different names). The above-described exemplary data supports are variety of request tracking schemes (carried out by processing the trace records either on the fly or from trace files 210).

Figure 4A:
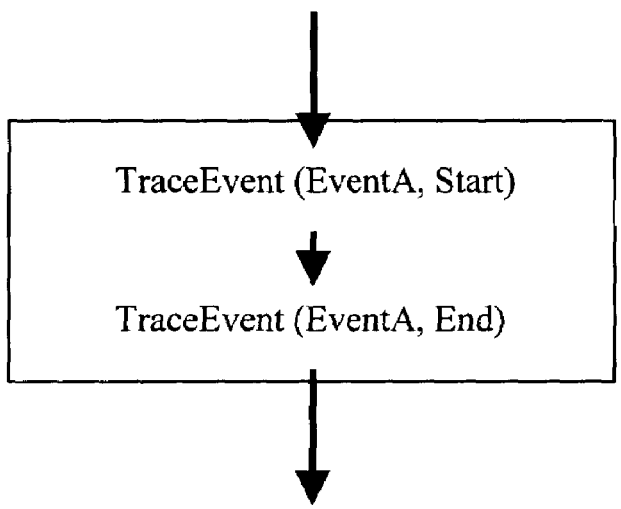
FIG. 4a is a flow diagram depicting a sequence of events associated with a request executed by a single thread.
Figure 4B:
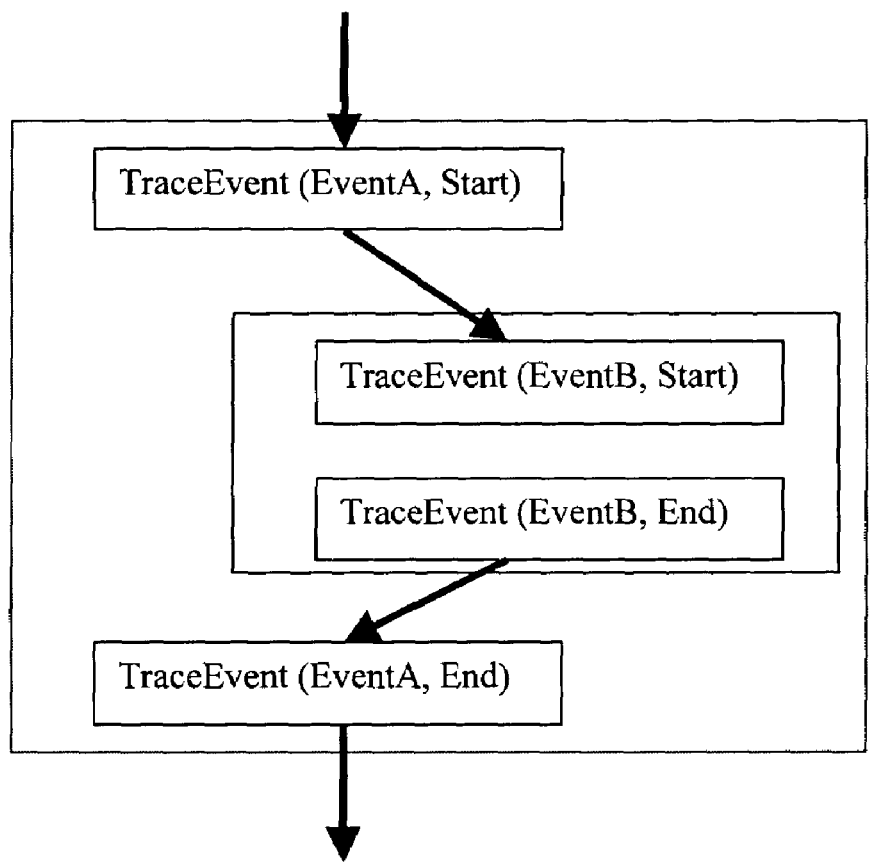
FIG. 4b is a flow diagram depicting a sequence of events associated with a request comprising multiple transactions executed by a single thread.
Figure 4C:
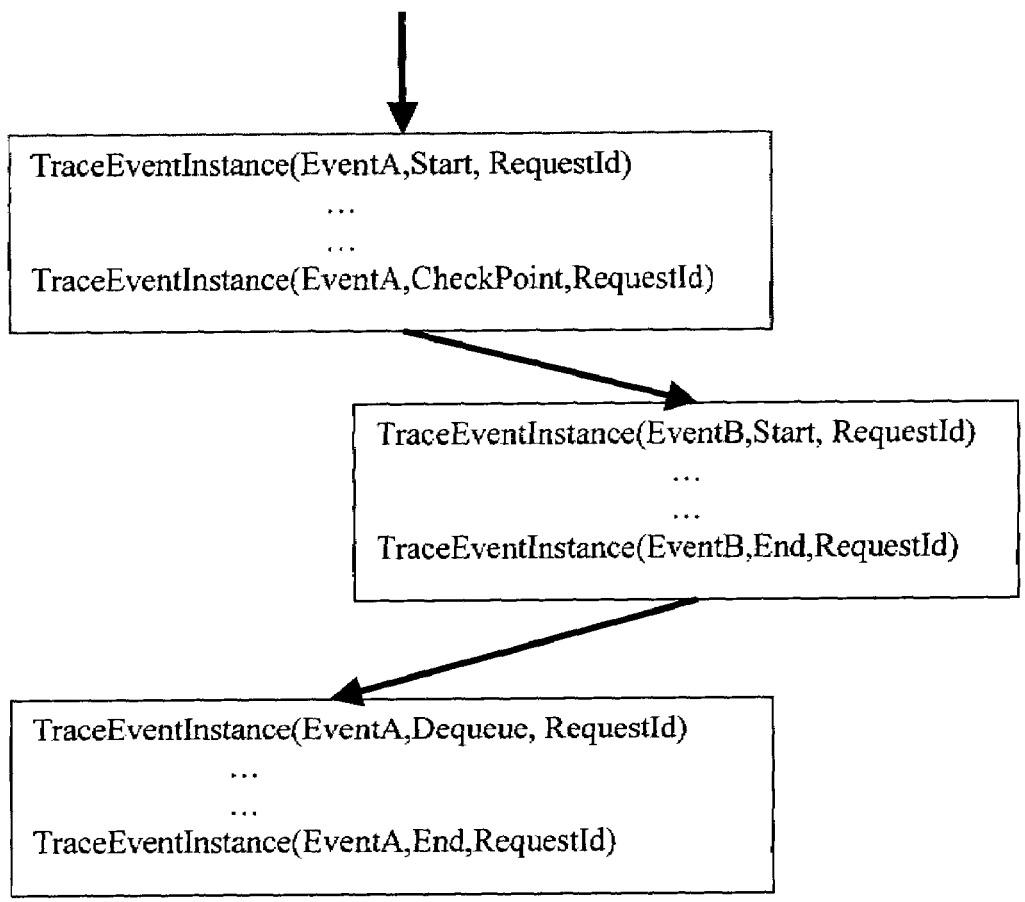
FIG. 4c is a flow diagram depicting a sequence of events associated with a request executed by multiple threads that use a same request identifier.
Figure 4D:
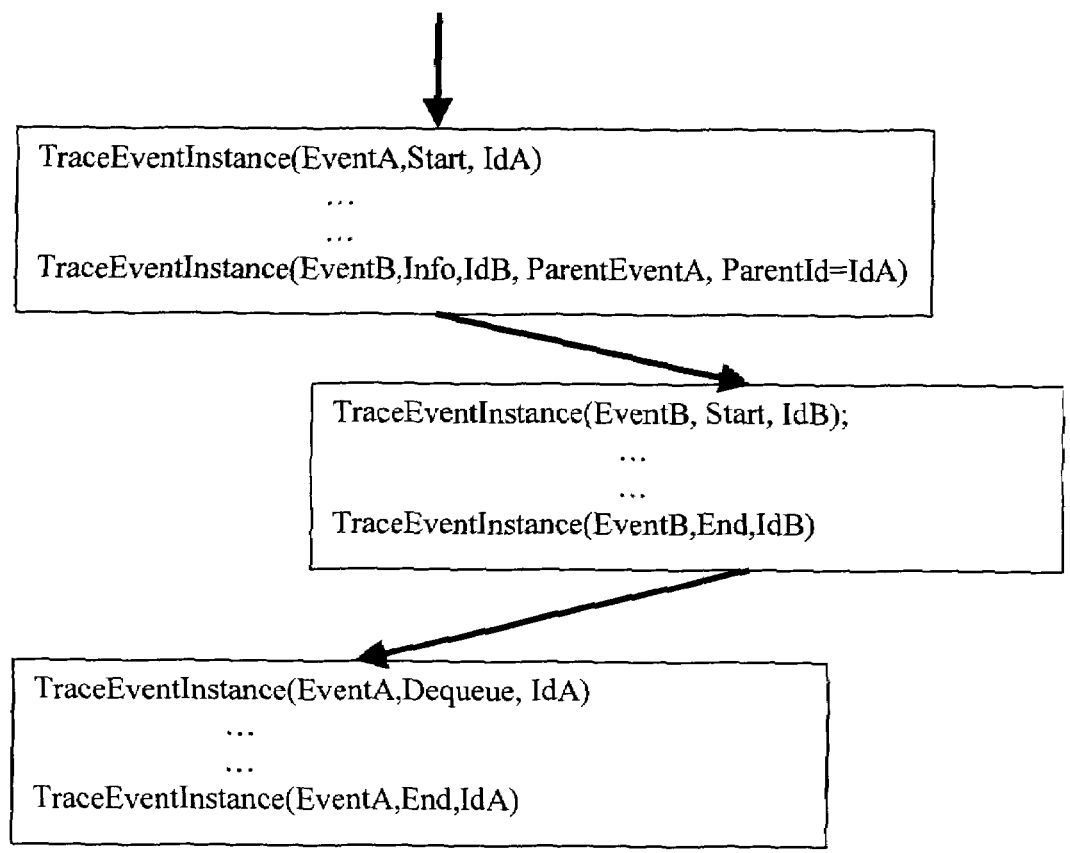
FIG. 4d is a flow diagram depicting a sequence of events associated with a request executed by multiple threads that use differing request identifiers.
Figure 4E:
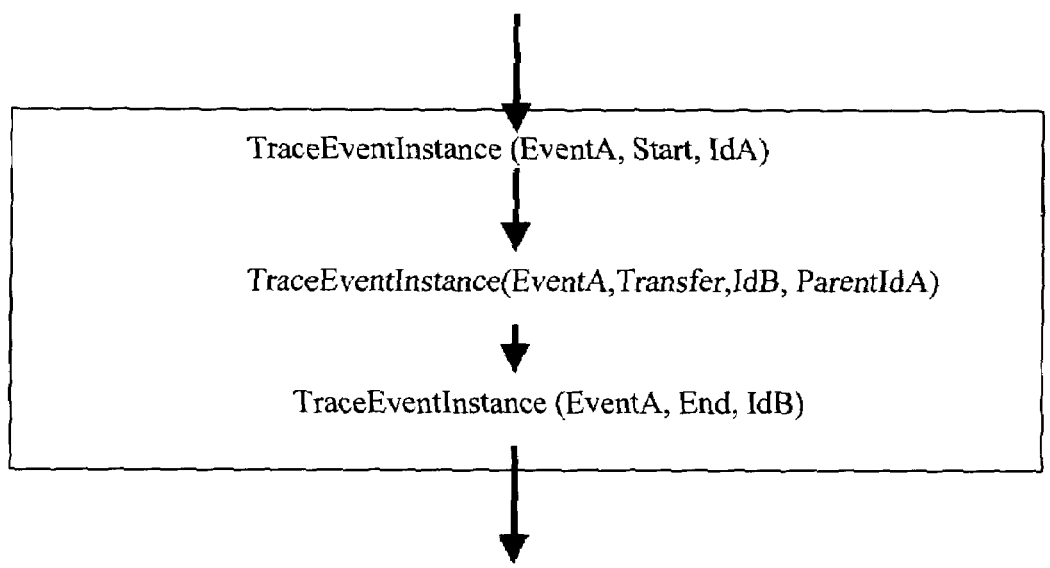
FIG. 4e is a flow diagram depicting a sequence of events associated with a request executed by one or more components and including changes to a request ID.
Figure 4F:
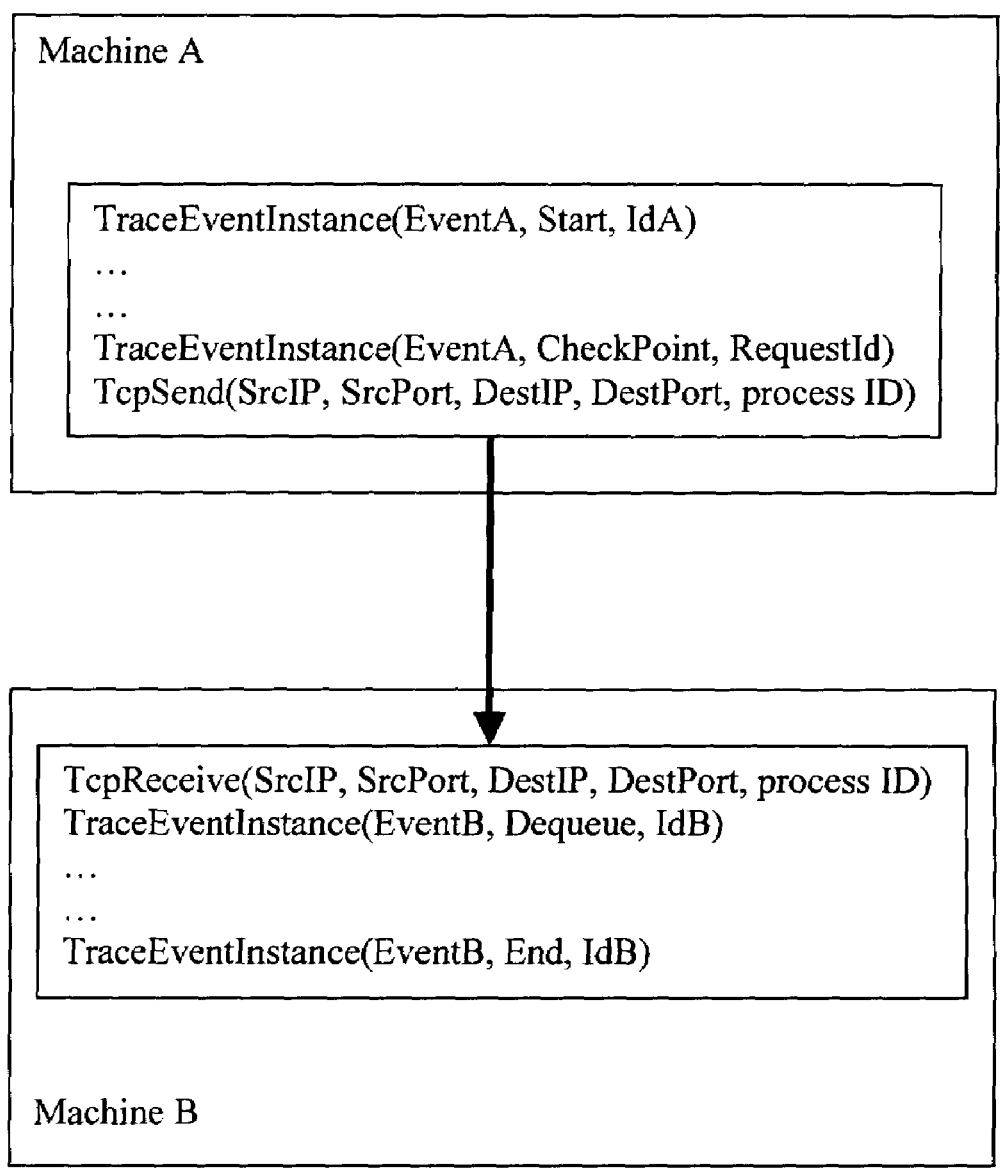
FIG. 4f is a flow diagram depicting a sequence of events associated with a request executed by multiple components across multiple machines including changes to a request ID.

Turning briefly to FIG. 3b, well known TCPIP and UDP events are instrumental in tying/linking request completion event records for events completed potentially by more than one machine (see, FIG. 4f). There are instrumentation points for Connect, Disconnect, Send, Receive, Accept, and Retransmit events. For each event, a handling routine provides the following information: a source IP address 320, a destination IP address 322, a source port 324, a destination port 326, a size of transfer in bytes 328 and a process ID 330. One or more of these fields can be used, in combination to uniquely identify a request across machine boundaries.

Having described an exemplary framework for creating and processing event trace logs facilitating linking a sequence of events marking completion of a request by a set of server components, attention is directed to a set of request tracking paradigms available in an exemplary system embodying the present invention. Tracking a request's completion is facilitated by associating an identification with the request and recording the request identification within a trace log (along with other relevant information such as a time stamp) at various stages of completing the request. The request tracking task is complicated by a need, in many cases, to pass a request through a number of components, and each component assigns its own unique identification to the request. In accordance with an embodiment of the invention, a handoff/deliver event record is logged prior to the handoff between two components of a server that contains the differing identifications of the request in the sender and recipient components of a request.

In a first request example depicted in FIG. 4a, the request is handled by a single thread transaction and does not traverse multiple threads during completions. This particular case does not require the above-described request completion tracing mechanism to execute the handoff event described herein above. The simplest case, depicted in FIG. 4a, is that of a single thread handling a request from start to end in a synchronous fashion. A function entry-exit pair is an example of this case. The thread ID, which is picked up by, for example, the operating system, and the thread ID is then used as the ID to correlate the start and stop events. In this particular example, event types EVENT_TRACE_START and EVENT_TRACE_END are used to bracket the request boundary. With continued reference to FIG. 4a, a call to a trace event handling method (e.g., TraceEvent) includes an EventA (identified in the form of an Event GUID 306) indicating the request type. A Start trace event and an End trace event (stored in the event type field 308 of a resulting trace record) are fired by a function identified in the box depicted in FIG. 4a to mark the entry and exit of the function. When the traces from such an implementation are processed, the following exemplary sequence of events are present in the raw trace.

| Event Name, | Type, | ThreadID, | TimeStamp |
|---|---|---|---|
| EventA, | Start, | 0x00000C08, | 126835008762731273 |
| EventA, | End, | 0x00000C08, | 126835008792776273 |

Note that the trace log itself potentially includes many events from other threads interspersed between the two above-identified start and end records for a request. However, it is unlikely that any of the other records will contain an identical Thread ID, and thus the Thread ID is used to track the requests handled by each thread and determine Response Time and Resource consumption values for each request. If a kernel request trace (Disk 10, Network, Memory, Registry), which tracks request completion activity by the core operating system, is enabled concurrently with an application request trace, the Start and End events are interspersed with kernel activity. In this case the ThreadID is a suitable reference for correlating operating system resource traces to the transaction, marked by the Start and End events, enveloping the kernel activity.

Having described what is generally considered the simplest case, a slightly more request completion arrangement is depicted in FIG. 4b. In this case, a first and second (nested) transaction are executed by a signal thread and therefore each event, marking the beginning and end of each transaction, has a same thread ID. As depicted in FIG. 4b, a request passes through two function calls marked by Event A and Event B. The sequence of transactions are handled by the same thread (as nested function calls), and events are fired for each function at an entry/exit point. The following is an exemplary sequence of trace records corresponding to the nested transactions depicted in FIG. 4b.

| Event Name, | Type, | ThreadID, | TimeStamp |
|---|---|---|---|
| LdapRequest, | Start, | 0x00000C08, | 126835008762731273 |
| DsDirSearch, | Start, | 0x00000C08, | 126835008762731283 |
| DsDirSearch, | End, | 0x00000C08, | 126835008762731293 |
| LdapRequest, | End, | 0x00000C08, | 126835008762731303 |

As shown in the above exemplary trace records, the resulting trace log records include a same Thread ID that is used during post processing to determine when each transaction occurred. In addition, the nested nature of these events is evidenced by the changed event names, and is recognized as such by the consumer 212 when processing the raw trace records. The consumer 212 can report the resource consumptions between start and end pair in an inclusive or exclusive form. In this context Inclusive time for Event A includes the resources used for Event B (as evidenced by traced kernel activity between the events), whereas Exclusive time for Event A excludes the resources charged to Event B.

In yet other cases, even when multiple threads service a single request, a value common to all transactions occurring within the request is available to trace completion by storing the common ID within, for example, the instance ID 310 of each trace record. In many server applications, a request is serviced by many threads during its life cycle. For example, a request may be initially received by a thread and placed in a work queue. Another thread from a worker thread pool picks up the request and performs some processing and places the partially completed request back in the queue. Several other threads may perform additional processing, de-queuing and queuing the request, before sending a response back to the client.

Each time a new thread assumes control of the request from the queue, events fired from the new thread will contain a new thread ID. However, the application maintains a request identifier, and all events fired during the life cycle of the request use a method supported by the operating system that provides the unique request ID throughout the life of the request. In such case, in addition to storing an Event GUID and Event type, each event record includes a request ID that is stored within the Instance ID 310. In an embodiment of the invention such request ID is provided by a CreateInstanceId method that generates a unique identifier that is passed along with the request to a next execution thread, in a same or different component, that works on the request. Alternatively the request completion across multiple threads is tracked by an address of a Request Object structure as the request identifier. The Request Object address is unique during the life cycle of a request.

Turning now to FIG. 4c, an enhanced trace event handling method (TraceEventInstance) supports designating additional information including, for example, a global request ID that follows the request as it traverses multiple threads. Initially, a request is started (marked by EventA start) by thread 1 in component A. The request is delivered to another component after some processing. This is marked by a checkpoint event—corresponding to placing the request on a queue. A thread executing in component B takes the request from the queue and operates on the request, raising EventB Start and End events to render corresponding trace log records for each event. Once component B completes EventB, the request is placed in a work queue. The queued request is later picked up by another thread in component A. The new thread in component A completes the request and returns a response—marked by EventA, End. The checkpoint-dequeue events can be used in any situation wherein request processing by a thread is paused and resumed by another thread at a later time. The checkpoint-dequeue trace events are used as markers by post processing tools (e.g. the consumer 212) to correctly attribute resource consumption by the request.

In the above-identified case, a unique request ID follows the request to completion. However, other cases where a request is processed by multiple threads, no such constant unique request identifier is maintained by the application. The next example, depicted in FIG. 4d, does indeed present a request identification boundary. The request identification boundary is overcome by including a handoff event/trace record that marks the transition from a first request identification tracking value to a second request identification tracking value.

The lack of availability of a shared request identifier can arise from a variety of causes. Examples of such causes include legacy software that does not support new request completion functionality, optimizations, or a lack of design consideration during development of the server component software. However, in accordance with an embodiment, request identification boundaries (due to the absence of a unique request identification across multiple components) do not hinder tracking requests. In accordance with the present invention, information linking identifications of distinctly identified stages of request completion executed by distinct entities (e.g., components) is utilized to trace completion of requests across one or more request identification boundaries. An example of such linking and request completion event tracing is provided herein below.

Referring to FIG. 4d, a first request processing example including request identification boundaries comprises three stages, completed by two server components (A and B), that carry out transactions corresponding to Event A and Event B. Each of the two server components (A and B) tracks its own activity using local identifiers IdA and IdB, respectively. Completion of the request is initially handled by component A, which fires a trace event and passes a set of parameters identifying: the transaction "EventA," the event type "Start," and the local identification "IdA."

As those skilled in the art will appreciate, an identification of a recipient of a request can be obtained by a sender of the request. By way of example, when one component calls into another component, the calling component sets up a calling context, by obtaining a connection handle (identification) or passing an opaque pointer to a data structure, so that responses can be associated with a corresponding request. In these situations the connection handle and the memory address of the data structure, used to pass the request context, supply the linking (request identification) information that facilitates tracing request completion across the request identification boundary.

Assuming that, prior to passing control over completion of the request to component B, the local identifier IdB is available to the component A, component A issues an "info" trace event including: the next transaction "EventB," the event type "info" (it is noted that the "info" event, in this case, also operates as the checkpoint event for component A), the component B's local identification for the request "IdB," a ParentEventA indicator (identifying the type of information provided—the Id of Event B's parent event), and the actual parent event Id "IdA." After, recording the parent/child event relationship in a trace log entry, component B takes over completion of the request (the beginning and end of which are registered by a Start and End event type accompanied by component B's local identifier (IdB). Upon completion, component B returns the request to component A's work queue.

Thereafter, component A issues a "dequeue" trace event and completes processing the request. Upon completion of the transaction corresponding to Event A, component A issues an "End" trace event.

In this example, since Event B has a different Id (IdB), without the linking information provided by the "info" event, the consumer 212 cannot recognize that the Event B trace log records are attributable to the request that began with the Event A transaction. However, the "info" event provides sufficient linking information to direct the consumer 212 to search for Idb when generating usage information relating to the request handled initially by component A. Thus, in summary, the TraceEventInstance method call is used, in the case where a local ID changes during the course of formulating a response to a request, to record the parent-child relationship between transactions. In the particular example, the TraceEventInstance call facilitates specifying the parent transaction's requestID (Event A's identification IdA) along with the current/recipient transaction's local request ID (IdB).

Referring to FIG. 4e a second example is provided for overcoming a request identification boundary. In this example, a request Id changes while being processed within a same component, or within differing components. There may be a global unique ID available, but this ID can change as a request advances in various components of a server system. In accordance with an embodiment of the present invention, upon determining that a request ID is going to change, a TraceEventInstance call is issued to record the changed request identification.

By way of example, in the context of MICROSOFT's IIS server environment, HTTP.SYS does not generate a unique identification, and instead temporarily uses a pointer to a structure, until it is about to hand the request over to the IIS server system. At handoff, the HTTP.SYS component generates a unique instance identification number. The handoff of the request is indicated/traced by marking the change/handoff from HTTP.SYS to the IIS system by firing a trace event specifying the old and the new instance identifications. In this case a "transfer" event type signals the handoff from the parent component A (having an identification "ParentIdA") to the recipient of the request, component B (having an identification "IdB"). The resulting trace event record indicates "a transfer of ID" event to enable the consumer 212, or any other trace log processing tool, to correlate events to a particular request having an identification change during the course of completion. Events attributable to the request that come after the "transfer" event use the new request identification.

It is noted that request identifications and data structures in memory tend to be recycled in server applications. Hence, knowing when a request is complete avoids improper analysis of the trace records. Thus, in an embodiment of the invention, the consumer 212, or any analysis tool, distinguishes an active request from a previously finished one by, for example, maintaining a list of active requests. Furthermore, a request may have multiple (intermediate) end points. In some instances, one cannot easily distinguish intermediate and final end points for a request. Thus, in an embodiment of the invention, multiple types of "End" events are supported by both/either the trace event method call and/or the consumer 212.

An excerpt of trace records, provided below shows how a request ID switches to a new ID during the life cycle of the request. There is an event (Deliver, a.k.a. Transfer) in the sequence that maps the old ID to a new ID to allow the consumer 212 to continue processing the request stream after the request ID changes. The change data is represented in the User Data field.

| Event Name, | Type, | TID, | Clock-Time, | Kernel (ms), | User (ms), | User Data |
|---|---|---|---|---|---|---|
| HttpRequest, | Start, | 0x00A0, | x0335927, | 3508425, | 0, | 0x88087000, 80.117.198.41, 0, 0 |
| HttpRequest, | Parse, | 0x00A0, | x0336396, | 3508425, | 0, | 0x88087000, 4, "http://msdn.microsoft.com:80/..." |
| HttpRequest, | Deliver, | 0x00A0, | x0336648, | 3508425, | 0, | 0x88087000, 4611835303756300355, 1 |
| W3Server, | Start, | 0x0AF8, | x0337405, | 33600, | 53220, | 4611835303756300355, 0, 0 |
| W3Filter, | Start, | 0x0AF8, | x0337663, | 33600, | 53220, | 4611835303756300355, 0, 0 |
| W3Filter, | End, | 0x0AF8, | x0338319, | 33600, | 53220, | 4611835303756300355, 0, 0 |
| W3Server, | FileReq, | 0x0AF8, | x0339621, | 33600, | 53220, | 4611835303756300355, "d:\http\vbasic\art\\a.gif" |
| HttpRequest, | RecvResp, | 0x0AF8, | x0344117, | 33600, | 53220, | 4611835303756300355, 0, 0 |
| HttpRequest, | End, | 0x0AF8, | x0345329, | 33600, | 53220, | 4611835303756300355, 0, 0 |

Figure 5A:
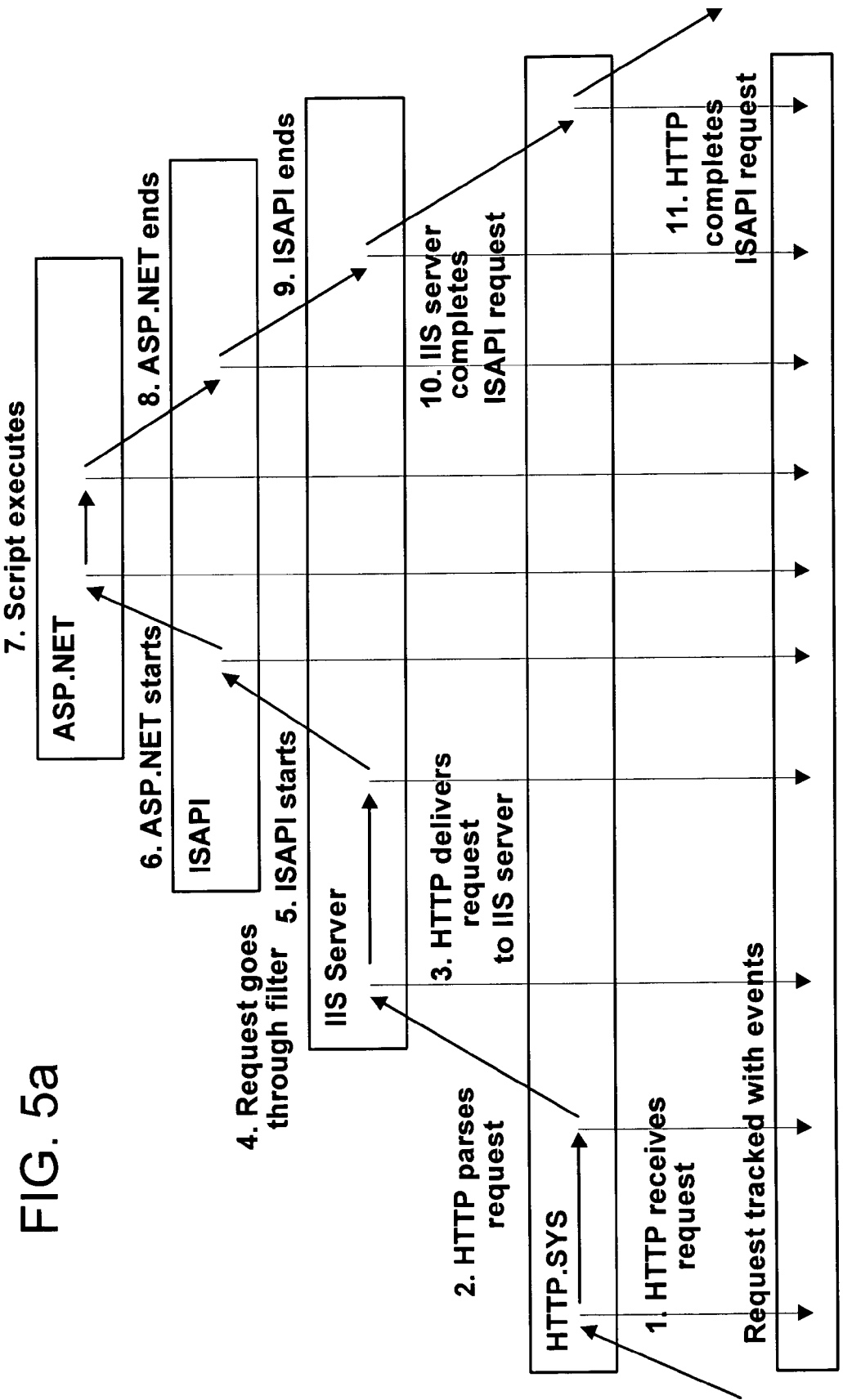
FIG. 5a is schematic diagram depicting a set of server components that complete a request for a request item via an Internet server.
Figure 5B:
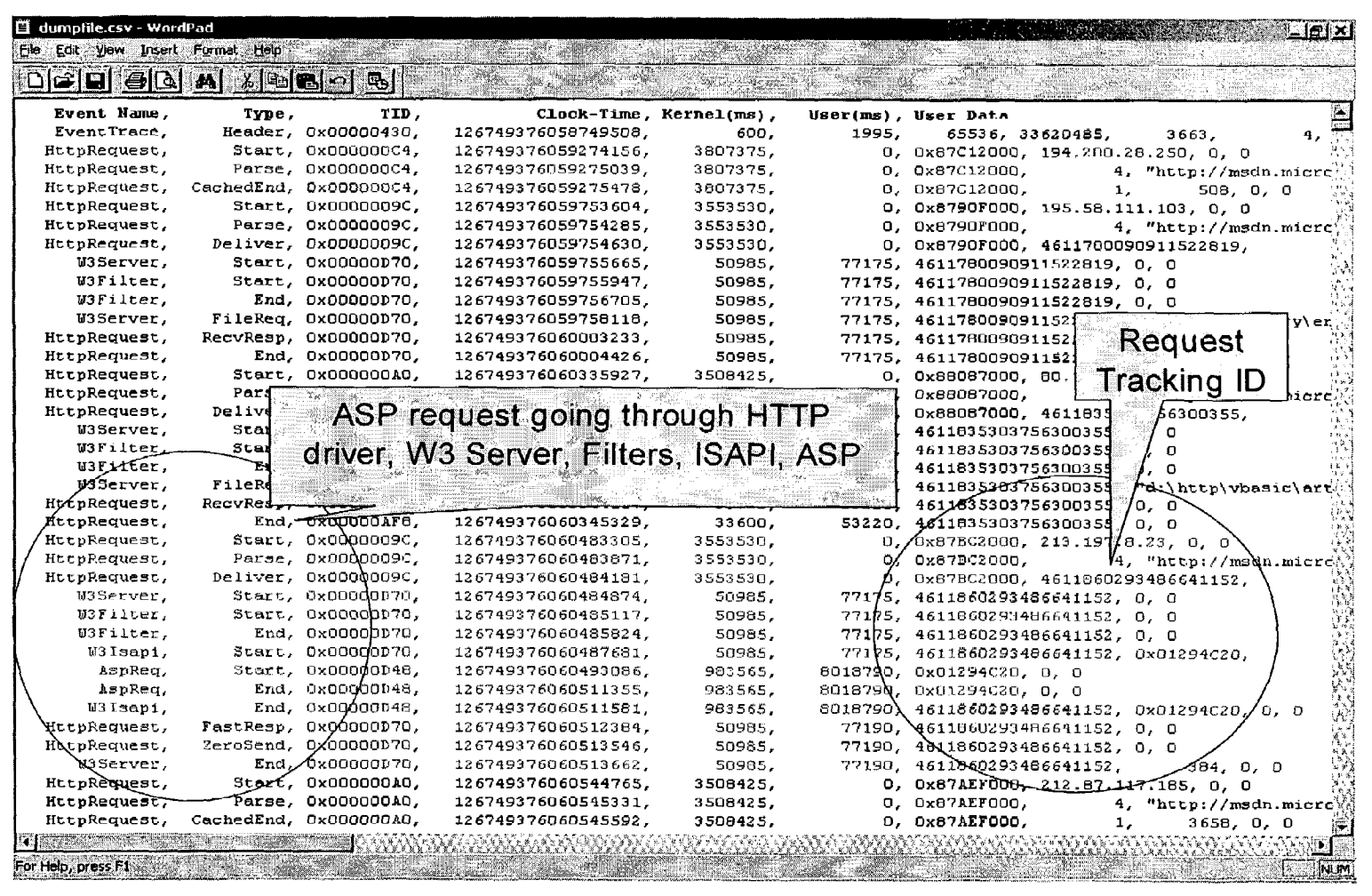

Another example of request identification boundaries is provided with reference to FIGS. 5a and 5b. FIG. 5a depicts an exemplary HTTP Request Tracking model for MICROSOFT's IIS server software. An HTTP request is initially handled by HTTP.Sys. Thereafter, if the request is not completed via the machine's cache, then the request is forwarded to the IIS system. Assuming that the file needs to request the file, the request passes to the ISAPI component. The ISAPI component then passes the request to the ASP.NET component which then executes the request and ends. The completed request is returned to the ISAPI component. The ISAPI component ends and then returns the request back to the IIS server component.

The above sequence of transactions for completing the single HTTP request includes multiple components and encounters multiple request identification boundaries. With reference to FIG. 5b, a set of exemplary trace records illustratively depict the handoffs between various components and request identification links are maintained in the user data section of the trace event records. The first request identification barrier is encountered when the HTTP.sys component passes the request to the IIS W3 server. A deliver event is fired to store the original (0x87BC2000) and new (4611860293486641152) request identifications. Thereafter, the ISAPI component executes a Transfer/Start event that transitions the request identification from 4611860293486641152 to 0x01294C20—the local ID assigned to the request for handling by the ASP.NET component. Thereafter, when the ASP.NET component completes processing the request, it issues an End event and returns the results back to the ISAPI component. The ISAPI component executes a Transfer/End event that creates a trace record linking the ASP.NET request ID (0x01294C20) to the original IIS server component request ID (4611860293486641152).

A third type of identification barrier involves requests that are executed across potentially multiple machines. In distributed systems, an application request potentially passes through multiple systems before returning a response to the client. To perform request tracking in such an environment, the request identification is tracked across machine-imposed request identification boundaries. Tracing is enabled on all machines that process the request. The trace records are generated and collected separately by each machine. The request identifies a source machine. When traces from multiple machines are processed centrally the post processing code links the events and returns them in order. The request tracking logic explained above with reference to FIGS. 4c, 4d and 4e is applicable here as well.

If a request context is passed across machine boundaries by the distributed framework, then it can be used to correlate the requests. In cases where the RequestID can not be transferred to another machine, TCPIP events are used to identify the "transfer event" that maps a request on the client machine to a request serviced by the server machine. Furthermore, processing execution times requires synchronizing the relative times on each machine. In cases where clocks are skewed, the same TCP/IP events are used during post processing to adjust for clock skew across machines. When a TCP connection is opened, TCPIP events fire on both the source and the destination. Using these events as synchronization events, the consumer 212 adjusts the clock skew during post processing and orders the events.

Having generally described tracking a request across machine boundaries, an example of such tracking is provided in FIG. 4f. Referring to FIG. 4f a sequence of trace events are listed that show, by way of example, how an HTTP request is traced across machine boundaries. Each of the two distinct component/threads within the two distinct Machines (A and B) tracks its own activity using local identifiers IdA and IdB, respectively. Completion of the request is initially handled by component A on Machine A, which invokes a TraceEventInstance method that fires a trace event and passes a set of parameters identifying: the transaction "EventA," the event type "Start," and the local identification "IdA." Thereafter, the thread executing within component A, invokes the TraceEventInstance method and passes a set of parameters identifying: the transaction "EventA", the event type "Checkpoint" (relinquishing control to another thread), and a request ID. Next, a TcpSend method is invoked on Machine A and a trace event log entry is created that includes: a source IP address, a source port, a destination IP address, a destination port, and a process ID. Thereafter, the request is transported from Machine A to Machine B.

At Machine B, a TcpReceive method is invoked that identifies: a source IP address, a source port, a destination IP address, a destination port, and a process ID. Each of these values matches the values in the TcpSend method invoked on Machine A. The next logged event arises from a TraceEventInstance method invoked when the request is dequeued. The method call passes a set of parameters identifying: the transaction "EventB," the event type "Dequeue," and the local identification "IdB." When the request has completed a TraceEventInstance method is invoked with parameter values identifying: the transaction "EventB," the event type "End," and the local identification "IdB."

It is noted that the three above-described completion identification tracking schemes for overcoming request identification boundaries are merely exemplary. As those skilled in the art will readily appreciate, there are a variety of situations where executing a handoff tracking event, which marks an identification transition, will overcome loss of tracking capability with regard to completed requests. The present invention contemplates such alternative cases that would benefit from the exemplary ID transition tracking events described herein.

Figure 6:
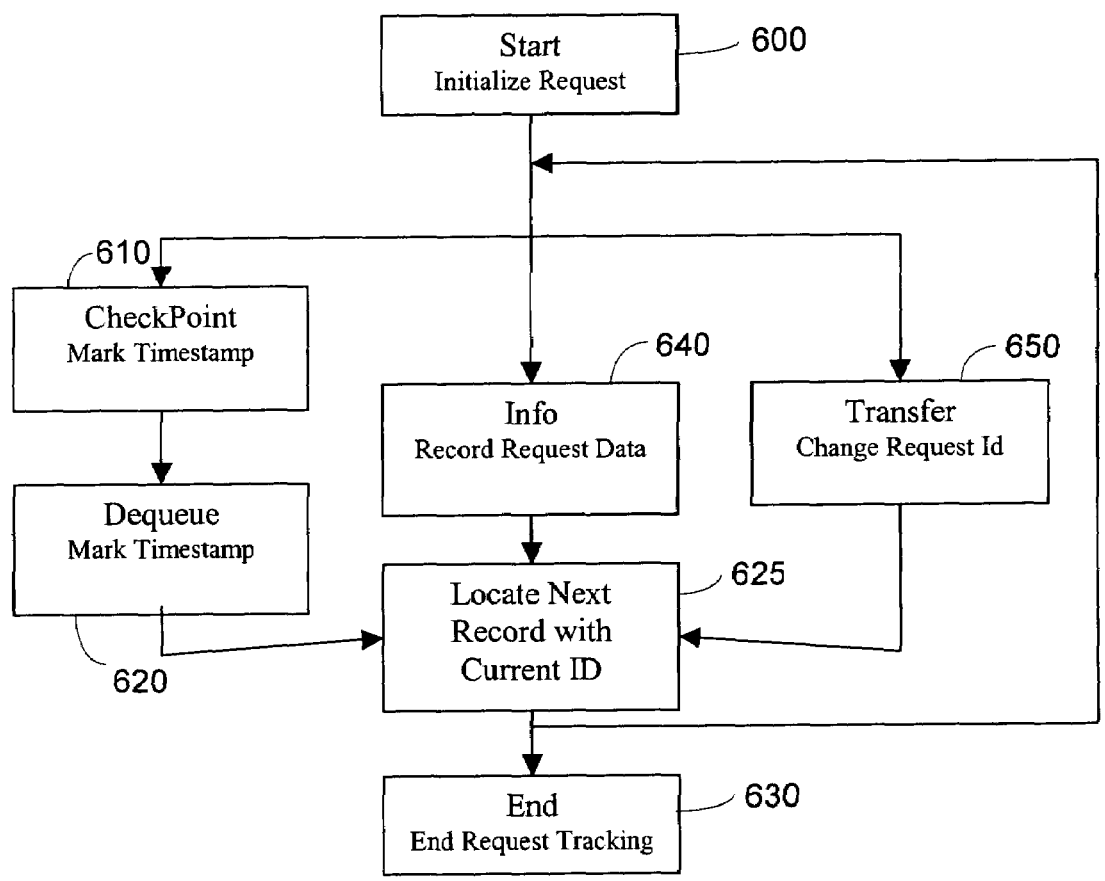
FIG. 6 is a flowchart depicting the flow of execution of a set of steps carried out by a consumer of trace log records in accordance with the present invention.

Turning now to FIG. 6, an exemplary set of steps depict the course of actions performed by the consumer 212 to organize the trace event log entries within the trace files 210 to facilitate rendering performance data on servicing requests that potentially include request identification boundaries. The flowchart depicted in FIG. 6, represents the processing model incorporated by the consumer 212 when searching for and processing a sequence of event logs corresponding to a single request. Processing of a particular request begins when a Start event type is encountered during step 600. Processing the Start event for a particular requests includes recording the initial request ID assigned to the request. Thereafter, at step 625, the consumer 212 searches for a next event including the current ID associated with the request. Potential event types include: checkpoint, info, and transfer event types.

If the next encountered trace event is a "checkpoint" event, then the consumer marks the timestamp at step 610. In this exemplary embodiment, a request ID persists during a checkpoint and therefore, the next trace event record is a "dequeue" event which the consumer 212 locates (using the current id) at step 620. At this point, the next record type encountered by the consumer 212 can be any type except another dequeue or start event.

If an "end" event type is encountered as the next record, then all the records for the particular request have been acquired and control passes to step 630. At step 630, the complete set of trace records are accumulated and stored together. If an "info" event type is encountered with the current ID associated with the request, then control passes to step 640 wherein request-related data is stored. If a "transfer" event type is encountered, then control passes to step 650 wherein the consumer 212 changes the current ID attributed to the request to the new request ID designated in the transfer trace event record. At step 625 the consumer 212 uses the new request ID to locate a next trace event record in the set of chronological trace event records in the event log.

Turning now to FIGS. 7a and 7b, two exemplary state machines are depicted that drive the operation of the consumer 212 during processing of trace records rendered by particular request processing. By way of background, there are times when the implicit request tracking models described above are not sufficient to express a request processing architecture. This may be due to legacy issues or protocol limitations in passing request context information across two components or machines. Examining the raw traces from such a scenario may reveal a seemingly unrelated sequence of events. However, in an embodiment of the invention, request tracking knowledge is provided to the trace consumer 212 in the form of a state machine definition to correctly associate request flow. By way of example, FIG. 7a depicts an XML-based state machine for a request flowing through multiple components. Thus, the state machine helps fill tracking holes that might otherwise exist if only the above event tracking paradigms are used to track request completion across multiple threads, processes, components and/or machines.

State machines also define the boundaries of particular of requests in a way that builds upon and differs from the limited ways of recording express boundaries through Start/End points in the trace event log files. Referring to FIG. 7b, an XML state machine defines the boundaries of a request from event types provided in a trace record file. Such state machines enable custom definition of composite events for richer analysis of event trace records. By way of example, a file server services several types of requests such Open, Read, or Close. While these individual requests provide some metrics, what is interesting from a performance analysis/diagnostic point of view is to recognize the pattern: an open request, a subsequent series of read commands, and finally a close command on the same handle. This new "composite" request will enable defining a new "Directory Scan" request.

The request state machine for an exemplary Directory Scan is provided in FIG. 7b. The first two events that are expected in observing a trace log are a Start and End for a directory open event type. Thereafter, a series (loop) of start and stop event pairs for a read event should be observed. The loop exits when a Start/End event pair for a directory close request is received.

When raising events for request tracking, the trace events follow the execution flow of the request and raise events from various points in its path. Initially, the tracking functionality of the system designates a unique identifier for a request instance. Typical applications have facilities for generating such an instance identifier. However, such identifiers can be requested, in an embodiment of the invention from the operating system. Thus, at the logical start of the request, a provider fires an event with a "start" event type with the designated request ID.

Figure 8:
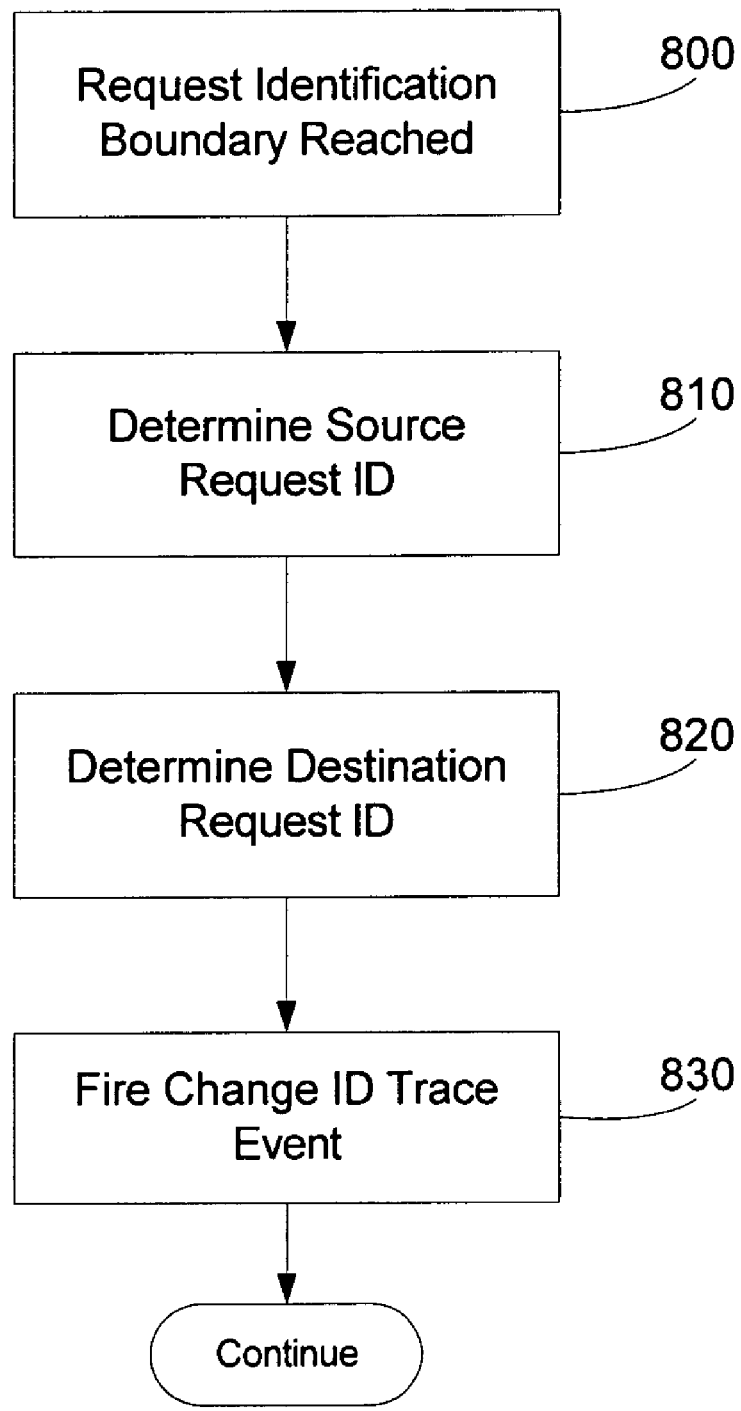
FIG. 8 is a flowchart summarizing the steps for generating a trace event record facilitating associating other event records corresponding to a same request but having differing request identifications.

Thereafter, if the request execution flow moves from one component to another, then the request ID should pass between the components as well and the same request identification is included in subsequent trace events. However, if the request ID cannot be passed between components/threads/processes/machines, then a transfer event is generated to map the request ID in a source component to a new request ID in the destination component. Turning to FIG. 8, an exemplary set of steps depict the flow of operations performed when a request identification boundary is encountered that necessitates tracking a request identification change.

Initially, at step 800 a point is reached in thread execution where identifications for the request are available from both sides of a request identification boundary. Such location generally arises where a call is made from one component to another. Next, at step 810, a provider determines the request identification from the source. At step 820 the destination request identification is determined. Thereafter, at step 830 the provider fires an event such as the transfer event identified in FIG. 4e. The request flow thereafter continues with the new request ID accompanying trace event firings.

It will be appreciated by those skilled in the art that a new and useful method and framework for tracing request completions spanning multiple threads/processes has been described herein. In view of the many possible computing environments to which the principles of this invention may be applied and the flexibility of designing and carrying out software development/performance evaluation tools, it should be recognized that the embodiments described herein are meant to be illustrative and should not be taken as limiting the scope of invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for tracking an execution of a single request across a request identification boundary in a computer system the method comprising:

providing a trace log for recording one or more events that occur during the execution of the single request across the request identification boundary, the request identification boundary comprising a change to an identification of the single request during the occurrence of the one or more events, the request identification boundary selected from a group of request identification boundaries including processing the single request by a first and a second server component;

first recording, within the trace log, a first event including a first request identification;

second recording, within the trace log, a second event including a second request identification;

storing linking information, within the trace log comprising marking, within the trace log, the change to the identification of the single request from the first request identification to the second request identification, and wherein the linking information comprises a request identification transition event record, and wherein the request identification transition event record includes:

a transition event identifier, the first request identification, and the second request identification.

2. The method of claim 1 wherein the group of request identification boundaries includes processing the single request by a first and a second thread.

3. The method of claim 1 wherein the group of request identification boundaries includes changing the identification of the single request while completing a same transaction arising from the single request.

4. The method of claim 1 wherein the group of request identification boundaries includes transferring the single request from a first machine to a second machine.

5. The method of claim 1 further comprising the step of correlating, by a consumer utility, the first and second events to the single request using the linking information.

6. The method of claim 5 further comprising applying by the consumer utility, a set of trace records for the single request, including event records for the first and second events, to a state machine.

7. The method of claim 6 wherein the state machine models a sequence of events corresponding to a composite request.

8. The method of claim 6 wherein an event type value is stored for each recorded event and wherein the event type value directs progression of the state machine.

9. The method of claim 1 wherein the storing linking information step is performed after the first recording step and before the second recording step.

10. The method of claim 1 wherein the first recording step and second recording step each comprises storing a timestamp corresponding to the first and second events, respectively.

11. A computer-readable storage medium embodying a program of computer-executable instructions for enabling a computer to perform the steps for tracking an execution of a single request across a request identification boundary in a system, the steps comprising:

providing a trace log for recording one or more events that occur during the execution of the single request across the request identification boundary, the request identification boundary comprising a change to an identification of the single request during the occurrence of the one or more events, the request identification boundary selected from a group of request identification boundaries including processing the single request by a first and a second server component;

first recording, within the trace log, a first event including a first request identification;

second recording, within the trace log, a second event including a second request identification;

storing linking information within the trace log comprising marking, within the trace log, the change to the identification of the single request from the first request identification to the second request identification within the trace log; and wherein the linking information comprises a request identification transition event record, and wherein the request identification transition event record includes:

a transition event identifier, the first request identification, and the second request identification.

12. The computer-readable storage medium of claim 11 wherein the group of request identification boundaries includes processing the single request by a first and a second thread.

13. The computer-readable storage medium of claim 11 wherein the group of request identification boundaries includes changing the identification of the single request while completing a same transaction arising from the single request.

14. The computer-readable storage medium of claim 11 wherein the group of request identification boundaries includes transferring the single request from a first machine to a second machine.

15. The event tracing framework computer-readable storage medium of claim 11, wherein the steps further comprise comprising a consumer utility including computer-executable instructions facilitating performing the step of providing a consumer utility for correlating the first and second events to the single request using the linking information.

16. The computer-readable storage medium of claim 15, wherein the steps further comprise facilitating applying a set of trace records for the single request, including event records for the first and second events, to a state machine.

17. The computer-readable storage medium of claim 16 wherein the state machine models a sequence of events corresponding to a composite request.

18. The-computer-readable storage medium of claim 16 wherein an event type value is stored for each recorded event and wherein the event type value directs progression of the state machine.

19. The computer-readable storage medium of claim 11 wherein the storing linking information step is performed after the first recording step and before the second recording step.

20. The computer-readable storage medium of claim 11 wherein the first recording step and second recording step each includes storing a timestamp corresponding to the first and second events, respectively.

21. A computer-readable storage medium-embodying a program of computer-executable instructions for enabling a computer to perform the steps for generating performance reports relating to tracking an execution of a single request across a request identification boundary in a system the steps comprising:

providing a trace log for recording one or more events that occur during the execution of the single request across the request identification boundary, the request identification boundary comprising a change to an identification of the single request during the occurrence of the one or more events, the request identification boundary selected from a group of request identification boundaries including a change of components processing the single request, and providing an event log consumer utility for generating performance data associated with the single request, comprising:

first locating, within the trace log, a first event including a first request identification;

second locating, within the trace log, a second event including a second request identification;

reading linking information, within the trace log, the linking information comprising a record of the change to the identification of the from the first request identification to the second request identification;

correlating the first event and second event with the single request; and wherein the linking information comprises a request identification transition event record, and wherein the request identification transition event record includes:

a transition event identifier, the first request identification, and the second request identification.

22. The computer-readable storage medium of claim 21 wherein the linking information is provided by an event trace record, the event trace record including a transfer event type, a source request identification and a destination request identification.

23. The computer-readable storage medium of claim 21 wherein the group of request identification boundaries includes a change of machines processing the single request.

* * * * *